United States Patent
Beinemann

(10) Patent No.: US 11,460,285 B2
(45) Date of Patent: Oct. 4, 2022

(54) WORKPIECE HOLDER, MEASURING DEVICE AND MEASURING METHOD FOR MEASURING A WORKPIECE

(71) Applicant: Carl Mahr Holding GmbH, Goettingen (DE)

(72) Inventor: Martin Beinemann, Jena (DE)

(73) Assignee: CARL MAHR HOLDING GMBH, Göttingen (DE)

(*) Notice: Subject to any disclaimer, the term of this patent is extended or adjusted under 35 U.S.C. 154(b) by 722 days.

(21) Appl. No.: 16/410,718

(22) Filed: May 13, 2019

(65) Prior Publication Data

US 2019/0346246 A1 Nov. 14, 2019

(30) Foreign Application Priority Data

May 14, 2018 (DE) ...................... 10 2018 111 368.4

(51) Int. Cl.
*B23Q 17/20* (2006.01)
*G01B 5/00* (2006.01)
(Continued)

(52) U.S. Cl.
CPC ............. *G01B 5/0004* (2013.01); *B23Q 1/44* (2013.01); *B23Q 17/20* (2013.01); *G01B 5/20* (2013.01);
(Continued)

(58) Field of Classification Search
CPC ........ G01B 5/0004; G01B 5/213; G01B 5/20; G01B 5/201; B23Q 1/44; B23Q 17/20; G01M 11/0214; G01M 11/0221
(Continued)

(56) References Cited

U.S. PATENT DOCUMENTS 4,190,621 A 2/1980 Greshes
5,640,778 A 6/1997 Shiue et al.
(Continued)

FOREIGN PATENT DOCUMENTS

CN 201083492 Y 7/2008
CN 201110754 Y 9/2008
(Continued)

OTHER PUBLICATIONS

German Office Action dated Jan. 23, 2019, in corresponding German Patent Application No. 10 2018 111 368.4, with Machine English Translation (10 pages).
(Continued)

*Primary Examiner* — Isiaka O Akanbi
(74) *Attorney, Agent, or Firm* — Fitch, Even, Tabin & Flannery LLP

(57) ABSTRACT

A workpiece holder, measuring device, and a method for executing a measurement by using the workpiece holder. The workpiece holder is configured to hold a workpiece with two opposite arranged workpiece surfaces to be measured in a way that both are accessible by a moveable probe unit and can thus be measured in one setting of the workpiece. For this the workpiece holder comprises a support and a holding body. The holding body has a holding end away from the support with at least one holding surface at which the workpiece is held. In the holding body a free space is formed that adjoins the workpiece surface facing the support when a workpiece is held and makes the workpiece surface accessible for measuring or probing. The accessibility for the probe unit is provided by a transverse channel extending obliquely or orthogonally to the longitudinal axis of the workpiece holder.

12 Claims, 5 Drawing Sheets

(51) Int. Cl.
*B23Q 1/44* (2006.01)
*G01B 5/20* (2006.01)
*G01M 11/02* (2006.01)

(52) U.S. Cl.
CPC .... *G01M 11/0214* (2013.01); *G01M 11/0221* (2013.01)

(58) Field of Classification Search
USPC .................................................. 356/124, 127
See application file for complete search history.

(56) References Cited

U.S. PATENT DOCUMENTS

| | | | |
|---|---|---|---|
| 2003/0214646 | A1* | 11/2003 | Ito .................... B29D 11/00942 356/124 |
| 2005/0174566 | A1 | 8/2005 | Namiki |
| 2006/0209294 | A1 | 9/2006 | Murata |
| 2007/0236657 | A1* | 10/2007 | Mazoyer ................. B24B 9/146 351/178 |
| 2008/0007690 | A1* | 1/2008 | Mazoyer ................. B24B 49/12 351/178 |
| 2008/0192200 | A1* | 8/2008 | Iribarne ........... B29D 11/00961 356/127 |
| 2010/0134768 | A1 | 6/2010 | Hetzler et al. |
| 2012/0227476 | A1 | 9/2012 | Nakayama |
| 2014/0130363 | A1 | 5/2014 | Hagino et al. |
| 2014/0368813 | A1* | 12/2014 | Molinaro ............. G02C 13/005 356/127 |
| 2015/0323416 | A1 | 11/2015 | Kiontke |
| 2015/0352641 | A1 | 12/2015 | Mies |
| 2017/0082521 | A1* | 3/2017 | May ................... G01B 11/2441 |
| 2017/0348814 | A1* | 12/2017 | Wiegmann ............. G02B 27/62 |

FOREIGN PATENT DOCUMENTS

| | | |
|---|---|---|
| CN | 101324429 A | 12/2008 |
| CN | 201535655 U | 7/2010 |
| CN | 201645182 U | 11/2010 |
| CN | 206803901 U | 12/2017 |
| CN | 107655437 A | 2/2018 |
| DE | 4345093 A1 | 7/1995 |
| DE | 103 22 711 A1 | 12/2003 |
| DE | 10 2005 031 796 A1 | 1/2007 |
| DE | 10 2006 052 047 A1 | 5/2008 |
| DE | 10 2007 027 200 A1 | 12/2008 |
| DE | 10 2008 027 831 A1 | 12/2009 |
| DE | 10 2013 004 738 A1 | 10/2014 |
| DE | 202014004713 U1 | 5/2015 |
| DE | 10 2014 007 203 A1 | 11/2015 |
| DE | 10 2014 208 636 A1 | 11/2015 |
| DE | 10 2016 110 453 A1 | 12/2017 |
| JP | S53-124570 A | 10/1978 |
| JP | H3-85405 A | 4/1991 |
| JP | 2004-325387 A | 11/2004 |
| JP | 2004-342714 A | 12/2004 |
| JP | 2005-156260 A | 6/2005 |
| JP | 2005331497 A | 12/2005 |
| JP | 2008-116279 A | 5/2008 |

OTHER PUBLICATIONS

Hahne, F. Langehanenberg, P.; Automated asphere centration testing with AspheroCheck UP. Proceedings of SPIE, Oct. 16, 2017, vol. 10448, 104481H, Rochester, NY, USA. (8 pages).
Japanese Office Action dated May 14, 2020, in corresponding Japanese Application No. 2019-087521, with English translation (9 pages).
European Search Report dated Jun. 28, 2019, in corresponding European Application No. 19173285.8 (10 pages).
Chinese Office Action and Search Report dated Nov. 30, 2020, in corresponding Chinese Application No. 201910399283.4, with machine English translation (12 pages).
Japanese Office Action dated Apr. 26, 2021, in corresponding Japanese Application No. 2019-087521, with English translation (5 pages).

* cited by examiner

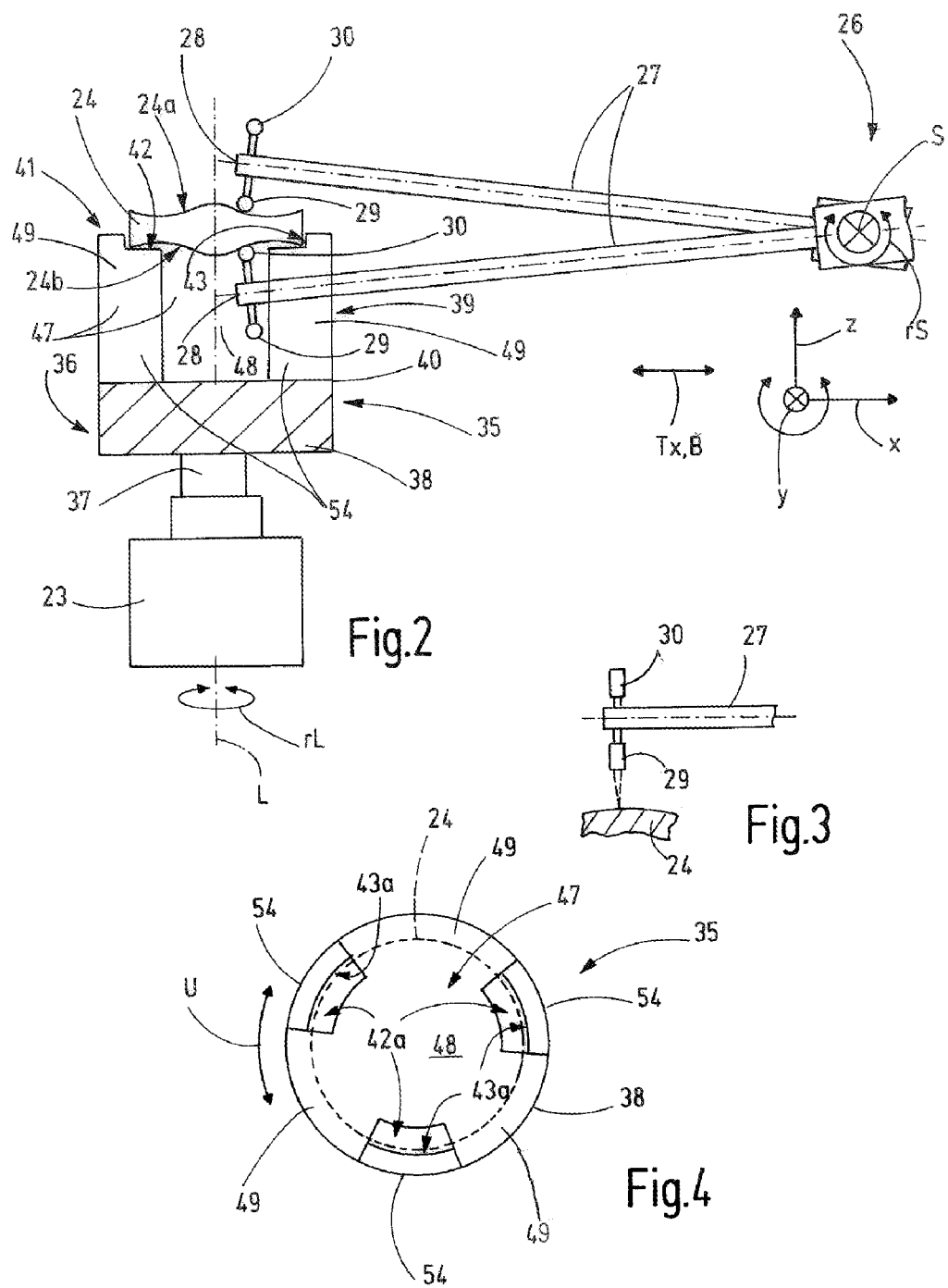

WORKPIECE HOLDER, MEASURING DEVICE AND MEASURING METHOD FOR MEASURING A WORKPIECE

RELATED APPLICATION(S)

This application claims the benefit of German Patent Application No. 10 2018 111 368.4, filed May 14, 2018, the contents of which is incorporated herein by reference as if fully rewritten herein.

TECHNICAL FIELD

The invention refers to a workpiece holder for holding a workpiece that has two workpiece surfaces to be measured that are present at opposite workpiece sides. The invention also refers to a measuring device and a measuring method for measuring the workpiece by using a workpiece holder.

BACKGROUND

Workpieces that have workpiece surfaces at opposite workpiece sides respectively, particularly curved workpiece surfaces, can be found frequently particularly in the field of optics. The workpiece surfaces can be at least in sections spherically or aspherically or can have a freeform. The workpieces can also be an array of microlenses and/or of cylindrical optics. Just optic workpieces require that the characterizing parameters of the workpiece surfaces are measured, e.g. the shape of the workpiece surface and/or the position and/or the orientation of one or more optical axes of each workpiece surface. In doing so, it is decisive to know the at least one geometric parameter of one surface exactly with reference to the at least one geometric parameter of the other surface.

Measuring of a workpiece surface or optical workpiece surface of a workpiece is, for example, known from DE 10 2014 208 636 A1 or DE 10 2016 110 453 A1.

In the prior art high efforts are pursued to arrange lenses in lens groups or objectives in a way such that deviations in the lens group or the objective are minimized. DE 10 2007 027 200 A1 proposes a projection illumination device for microlithography as well as a manipulator that orientates a bi-aspheric in a way that the imaging characteristics of the optical system are optimized. A method for targeted adjustment of optical assembly parts with reference to a datum axis is known from DE 10 2013 004 738 A1.

DE 10 2008 027 831 A1 refers to a measurement of the mid thickness of a lens. A lens to be examined is accommodated on a rotational support having a rotational axis. The rotational support is rotated about its rotational axis together with the lens. A laser beam is directed through the rotating lens parallel to the rotational axis and a spatial light sensor detects the wobble circle of the laser beam after passage through the lens. The lens is then aligned relative to the rotational support axis, in order to minimize the wobble circle. In this orientation the rotational axis of the rotating support extends through the middle of the lens that can be probed subsequently by a probe pair.

Hahne, Langehanenberg, "Automated asphere centration testing with AspheroCheck UP", Proc. of SPIE, Volume 10448, 104481H, 2017, doi:10.1117/12.2279674 describes the optical measurement of geometric parameters of a lens with two opposite optical measuring units. The optical measuring units have to be arranged on both sides of the object to be measured in the range of a common axis, which affects the set-up and the arrangement of the workpiece table for the workpiece to be measured.

From DE 10 2006 052 047 A1 a method and a device for determination of the position of a symmetry axis of an aspheric lens surface is known. The other opposite lens surface is not measured.

DE 10 2014 007 203 A1 describes the measurement of two workpiece surfaces of an optical workpiece, wherein one workpiece surface is measured first, the workpiece is subsequently turned manually about 180 degrees and the opposite workpiece surface is then measured in a second measurement path. This requires a highly precise and repeatable arrangement of the workpiece in the two orientations, in order to be able to relate these single measurements of the workpiece surfaces to each other, particularly the relative position or relative orientation of optical axes of the two workpiece surfaces.

Starting from the prior art it can be considered as object of the present invention to simplify the measurement of a workpiece, particularly an optical workpiece with two opposite workpiece surfaces to be measured.

SUMMARY

This object is solved by a workpiece holder, a measuring device, as well as a measuring method as described herein.

An inventive workpiece holder is configured to hold a workpiece with two workpiece surfaces to be measured that are present at opposite workpiece sides, during a measurement with a probe unit that is moveable along a workpiece surface. The workpiece is particularly an optical workpiece with two optical workpiece surfaces to be measured, e.g. a lens. Each of the workpiece surfaces to be measured can have on or more spherical or aspherical surface sections or a freeform or can be completely spheric or aspheric. Each workpiece surface can have concave and/or convex surface sections. The workpiece holder particularly allows the accessibility of both workpiece surfaces and the measurement of both workpiece surfaces in one single setting. The probe unit can comprise a probe arm with a contacting tactile probe element or a contactless operating probe element.

The workpiece holder has a support that is configured to be connected with a clamping device of a measuring device. For example, a cylindrical clamping pin can be present at the support for clamping in a clamping device.

The workpiece holder further comprises a holding body that is attached to the support at an attachment end and extends from the support to a free holding end. Along a longitudinal axis of the workpiece holder, the holding end is arranged with distance from the support.

At the holding end at least one holding surface is provided. The holding surface is configured to get into contact with a peripheral region of the workpiece and to hold the workpiece at the workpiece holder. The workpiece may lie on the at least one holding surface only due to the own weight and may be positioned by the at least one holding surface. Alternatively it is also possible to create a friction fit or force fit connection between the peripheral region of the workpiece and the holding end by a clamping action.

The holding body has a free space. A longitudinal axis of the workpiece holder extends through the free space. Starting from the longitudinal axis the free space comprises at least one transverse channel that extends orthogonally or obliquely to the longitudinal axis and ends at a peripheral opening of the holding body and is accessible from outside at this location. Due to the accessibility, the workpiece surface that faces or is assigned to the support can be measured by the moveable probe unit. The opposite workpiece surface faces away from the support and from the holding body and is also accessible by the probe unit. Thus, both workpiece surfaces can be measured in the same setting. The measurement is exact, quick and simply executable, either manually or automatically. Also the possibility exists to create a spatial relation between the geometric parameters of both workpiece surfaces easily and quickly.

In a preferred embodiment the at least one transverse channel is axially open at the side opposite the support. It passes completely through the holding body at the holding end in a direction parallel to the length axis.

In a preferred embodiment the free space comprises a plurality of transverse channels that lead into each other in the region of the longitudinal axis. The peripheral openings of the transverse channels are arranged with distance to each other in a circumferential direction about the longitudinal axis of the workpiece holder.

If a plurality of transverse channels is present, it is advantageous, if two transverse channels substantially extend along a common axis orthogonally to the longitudinal axis of the workpiece holder. In doing so, the access of the probe device to the workpiece surface along the whole diameter of the workpiece is possible. At least the free space with the at least one transverse channel is designed, such that the probe unit is able to measure the workpiece surface of the workpiece that faces the support along one line on the workpiece surface that is longer than the radius of the workpiece surface.

Preferably the free space is dimensioned sufficiently large such that the probe unit is shiftable inside the free space orthogonal to the moving direction during measurement, particularly in order to determine the respective apex (maximum or minimum) of a convex or concave surface section on the workpiece surface for the measurement and to position the probe unit and to move the probe unit during measurement in the plane of the apex.

A plurality of present transverse channels can divide the holding body in a plurality of holding body parts that are arranged with distance in circumferential direction. The holding body parts may be supported at the support, such that they are resiliently moveable relative to the longitudinal axis at the holding end.

In a view along the longitudinal axis the transverse channels may be star-shaped arranged. In the circumferential direction around the longitudinal axis the transverse channels may be regularly disposed, such that the angle between two directly adjacent transverse channels has respectively the same amount.

In a preferred embodiment the free space has a cylindrical or prismatical central region in the region of the longitudinal axis. The central region can be arranged symmetrically with regard to the longitudinal axis. The at least one transverse channel leads into the central region.

It is also advantageous, if each transverse channel comprises a main section and a slit section that is smaller in circumferential direction compared with the main section. The slit section connects to the main section in direction of the longitudinal axis. Particularly the slit section can be arranged at the holding end of the holding body. The main section of each transverse channel can adjoin the support in a direction parallel to the longitudinal axis.

For holding the workpiece at the holding end, the holding body can comprise an axial holding surface that faces away from the support. The normal vector of the axial holding surface has at least one axial component that faces away from the support and is preferably orientated parallel with the longitudinal axis. If the holding body is divided into a plurality of holding body parts, an axial holding surface section of the axial holding surface is present at each holding body part.

It is further advantageous, if the holding body comprises a peripheral holding surface at the holding end that extends in the circumferential direction about the longitudinal axis. The peripheral holding surface can face the longitudinal axis of the workpiece holder. In one embodiment the normal vector of the peripheral holding surface can be orientated radial to the longitudinal axis or comprise at least one component that is orientated radial to the longitudinal axis.

If the holding body is divided into a plurality of holding body parts, each holding body part comprises a peripheral holding surface section of the peripheral holding surface.

Thus, the axial holding surface and the peripheral holding surface or an axial holding surface section and a peripheral holding surface section respectively at one common holding body part can include an angle smaller than 180 degrees or smaller than 120 degrees and can preferably be orientated substantially orthogonally to each other and can support the workpiece at the peripheral region at its outer edge as well as one axial side. It is particularly advantageous, if the workpiece is not encompassed at opposite axial sides at the holding end. Thus, a simple insertion of the workpiece in the workpiece holder is possible.

Preferably a workpiece is positioned radially relative to the longitudinal axis and optionally clamped by the peripheral holding surface sections of a plurality of holding body parts in a force fit manner at a plurality of peripheral locations that are distant from one another.

The workpiece holder described above can be used in measuring device and a measuring method. The measuring device has a probe unit that is moveable in a moving direction and a clamping device that is configured to clamp the support of the workpiece holder. The longitudinal axis of the workpiece holder is in the clamp condition of the workpiece holder preferably orientated orthogonally to the moving direction of the probe unit. Due to the free space of the workpiece holder, the probe unit can measure the workpiece in one setting at both opposite axial sides and thus both opposite workpiece surfaces, in order to determine the geometric parameters to be measured. The workpiece is not reclamped (clamped again in a different orientation). It is thus possible to determine the relative position of the two workpiece surfaces relative to each other very simply and exactly.

It is advantageous, if the probe unit is moveable or positionable orthogonally to the moving direction and orthogonally to the longitudinal axis of the workpiece holder for determination of an apex of the workpiece surface, in order to perform the measurement in a measurement plane at the workpiece, in which the apex is present. The determination of the apex can be executed automatically or manually.

Preferably the probe unit of the measuring device comprises a probe arm. The probe arm has a free probe end with a first probe element that is orientated orthogonally to the probe arm longitudinal axis and with a second probe element that is orientated opposite to the first probe element. The first and the second probe element may operate in a tactile or contactless manner. Preferably a ball is used as tactile probe element.

Preferably the probe force with which a tactile probe element is pressed against the workpiece surface of the workpiece to be measured during the measurement is small and particularly smaller than 5 mN. The probe force has an amount of at least 0.5 mN in one embodiment.

The probe arm can be pivotably supported with distance to the probe end about a pivot axis. The pivot axis is preferably orientated orthogonally to the longitudinal axis of the workpiece holder and orthogonally to the moving direction of the probe unit.

An inventive measuring method comprises the following steps:

First, the workpiece is arranged at the holding end of the workpiece holder. Then the two workpiece surfaces are measured sequentially without reclamping of the workpiece, wherein the sequence of the measurement of the two workpiece surfaces is arbitrary. The first workpiece surface facing away from the support is measured by moving the probe unit along the first workpiece surface. The second workpiece surface that faces the support is measured by moving the probe unit along the second workpiece surface, wherein the probe unit engages into the free space and thus the access to the second workpiece surface is possible.

Prior to the measurement a computational and/or measurement determination of an apex (local or global maximum or minimum) on each workpiece surface can be performed, such that the subsequent measurement is executed in a measurement plane, in which the apex is present. The two measurement planes may be identical or parallel offset from each other.

By means of the workpiece holder, a manual as well as an automatic measurement of a workpiece, particularly an optical workpiece, is possible in a simple manner.

BRIEF DESCRIPTION OF THE DRAWINGS

Subsequently, preferred embodiments of the invention are explained in detail with reference to the drawings. The drawings show:

FIG. 2 a schematic block-diagram-like illustration of an arrangement of a workpiece to be measured in a workpiece holder during the measurement of the workpiece surfaces with a tactile measuring probe unit, FIG. 3 a schematic principle illustration of an alternative embodiment of a probe unit with contactless measuring probe elements, FIG. 4 a top view onto an embodiment of a workpiece holder along the longitudinal axis, FIG. 5 a perspective illustration of an embodiment of a workpiece holder, FIG. 6 a side view of the workpiece holder of FIG. 5, FIG. 7 a longitudinal section through the workpiece holder of FIGS. 5 and 6 along the line VII-VII in FIG. 6, FIG. 8 a top view onto the workpiece holder according to FIGS. 5-7, FIG. 9 a longitudinal section through the workpiece holder according to FIGS. 5-8 along line IX-IX in FIG. 8, FIG. 10 a schematic exemplary measurement of two opposite workpiece surfaces of a workpiece and FIGS. 11-14 a schematic principle illustration of different optical workpieces respectively that may be measured by means of the workpiece holder.

DETAILED DESCRIPTION

Figure 1:
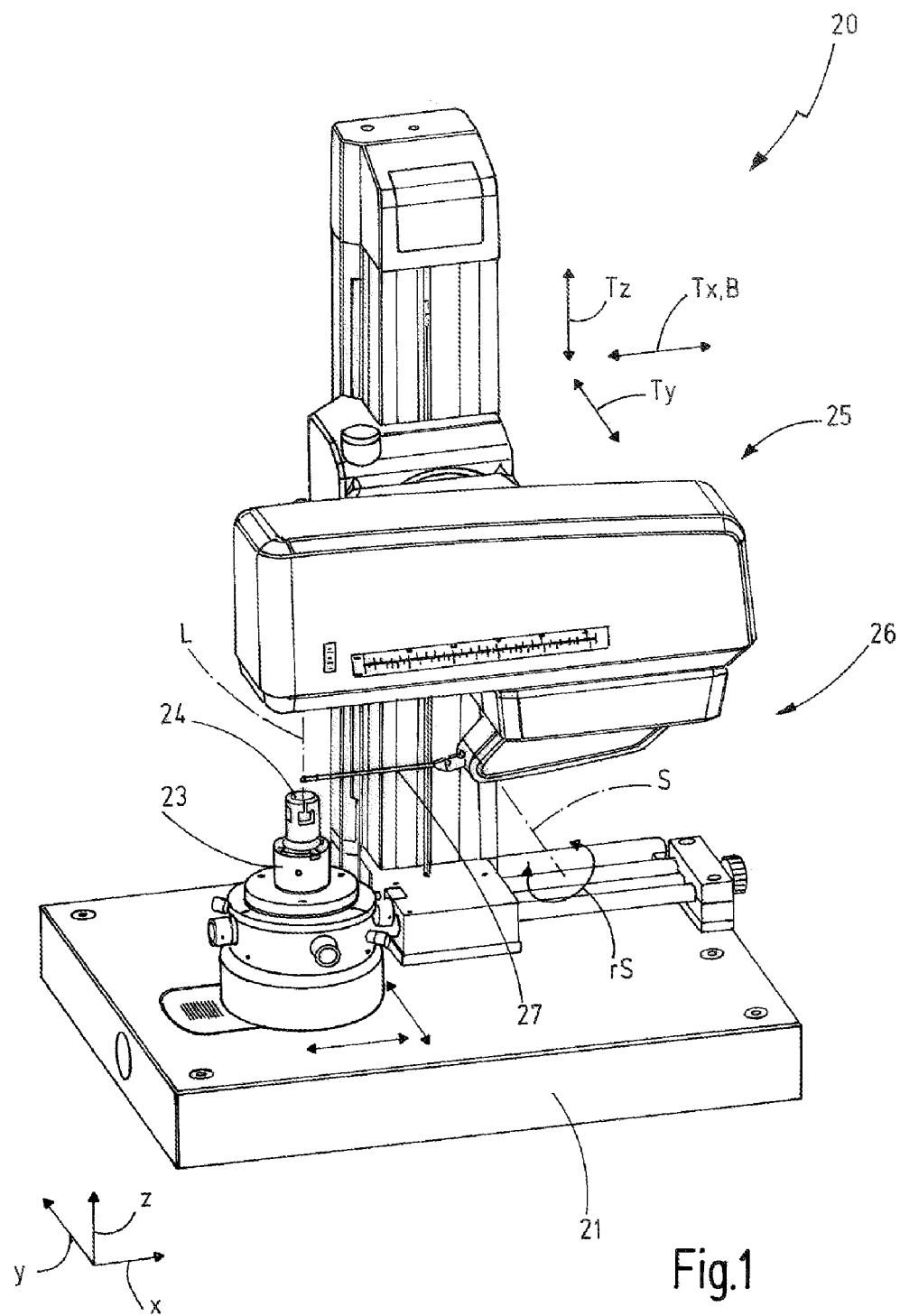
FIG. 1 an embodiment of a measuring device.
Figure 5:
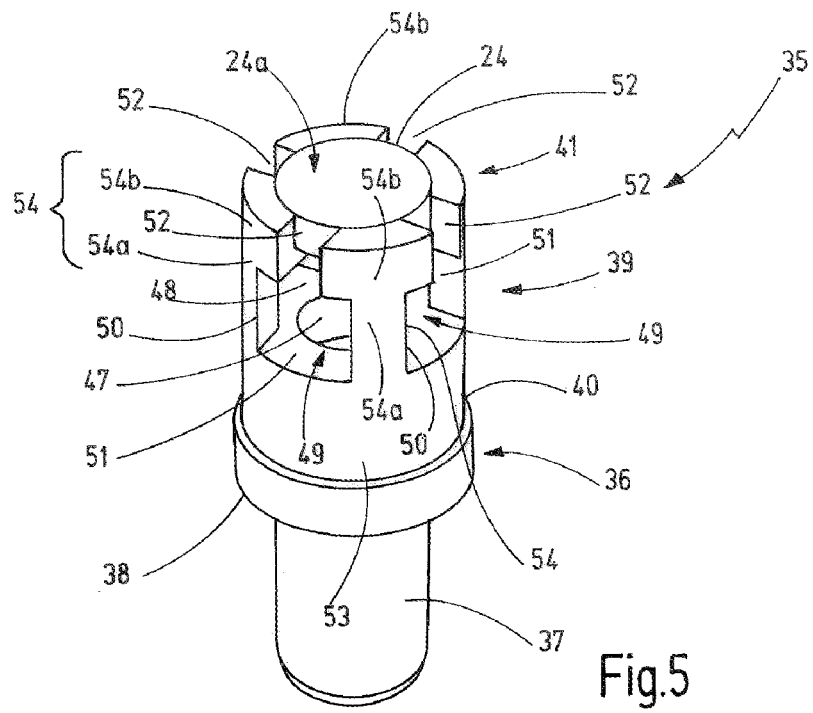
Figure 6:
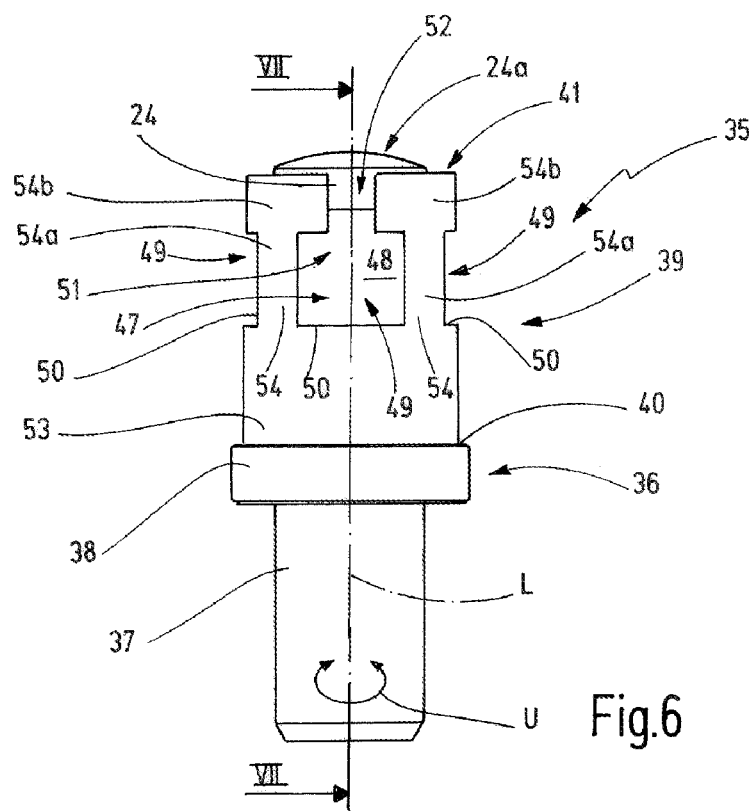
Figure 7:
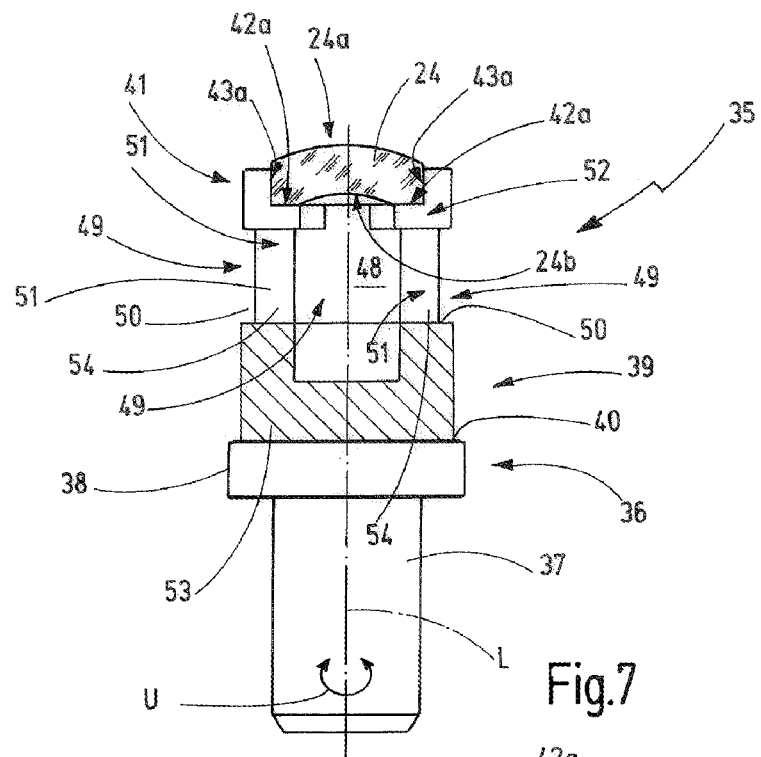
Figures 8, 9:
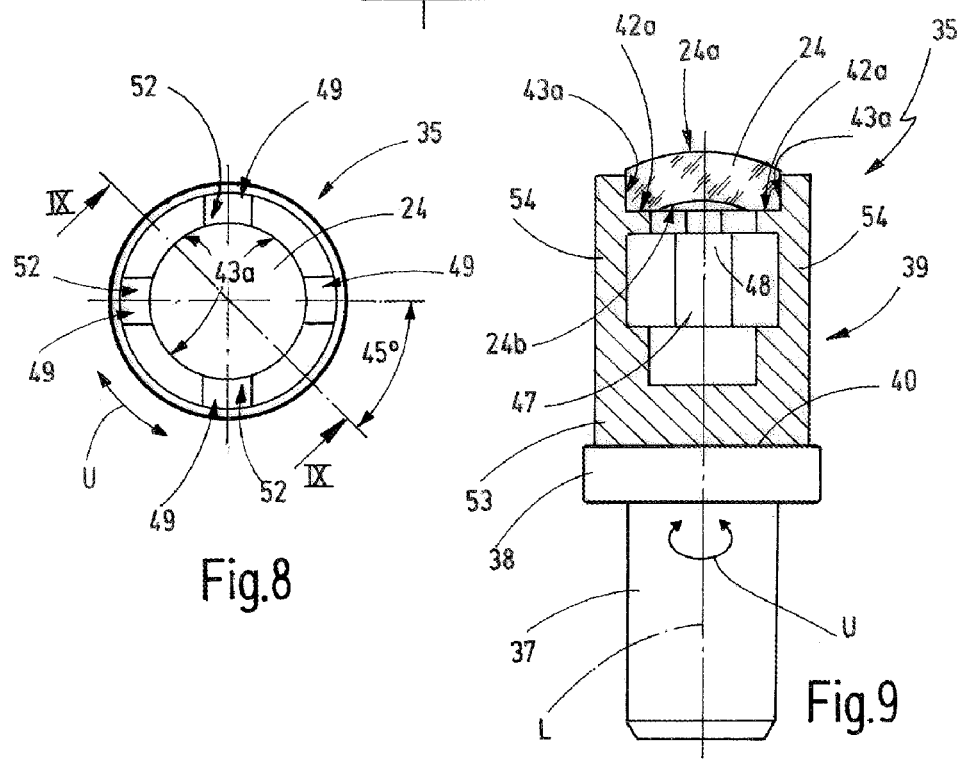

FIG. 1 shows an embodiment of a measuring device 20. The measuring device 20 has a machine basis 21. A cartesian coordinate system is especially fixed arranged to the machine basis 21 and defines an x-direction x, a y-direction y and a z-direction z.

At the machine basis 21 a clamping device 23 is arranged for clamping a workpiece 24 to be measured. The clamping device 23 is a manually positionable in x-direction and/or y-direction. It comprises a rotating drive with a rotating axis, by means of which workpiece 24 can be turned around its longitudinal axis L that is indirectly clamped by the clamping device 23. The rotating axis of the clamping device 23 can be positioned and aligned relative to the z-direction of the coordinate system x, y, z, for example manually. For doing this a controllable axes arrangement with respective translational and/or rotational degrees of freedom may be present alternatively.

The measuring device 20 further comprises a machine axes arrangement 25 for positioning and/or aligning a probe unit 26. The machine axes arrangement 25 has a translational degree of freedom Tz parallel to the z-direction, a translational degree of freedom Ty parallel to the y-direction and a translational degree of freedom Tx parallel to the x-direction, wherein this translational degree of freedom defines a moving direction B of the probe unit 26 during the measurement of a workpiece 24.

As it can be particularly seen in FIG. 2, in the present embodiment the probe unit 26 comprises a probe arm 27 that is pivotably supported around a pivot axis S, such that an additional rotational degree of freedom rS about the pivot axis S is formed. The pivot axis S extends orthogonally to the moving direction B, in which the probe arm 27 is moved during the measurement. In the present embodiment the pivot axis S is orientated parallel to the y-direction and the moving direction B is orientated parallel to the x-direction. The probe unit 26 can also be moved in y-direction before the measurement by means of the machine axes arrangement 25, in order to adjust the measuring plane or the measuring planes (x-z-plane) of the probe unit or the probe arm 27 respectively, in which is measured.

The machine axes arrangement 25 and the degrees of freedom for positioning and aligning the clamping device 23 are only exemplary. The number of translational and/or rotational degrees of freedom can be defined as suitable depending from the measuring task for which the measuring device 20 is configured and provided.

The probe arm 27 has a free probe end 28 distant to the pivot axis S, at which at least one probe element and in the present embodiment a first probe element 29 as well as the second probe element 30 are arranged. In the embodiment shown in FIG. 2, the probe elements 29, 30 are in the form of tactile probe elements 29, 30 and contact the workpiece 24 to be measured during the measurement. The probe elements 29, 30 are arranged at diametrical opposite sides of the probe arm 27 relative to the probe arm longitudinal axis. The probe elements 29, 30 extend so to say in opposite directions away from the probe arm 27. In the embodiment the probe elements 29, 30 each comprise a probe ball that contacts the workpiece 24 during the measurement.

As it is schematically illustrated in FIG. 3, the first and/or the second probe element 29, 30 can also be formed as contactless measuring probe elements that can be moved with distance to the workpiece surface 24a, 24b of the workpiece 24, for example, and create a measuring signal in order to be able to determine the distance of the probe elements 29, 30 to the workpiece surface 24a, 24b. For example, the probe elements 29, 30 can emit and receive light, particularly laser light, for the contactless measurement in order to evaluate the distance of the respective probe element 29, 30 to the workpiece surface of the workpiece 24.

For the measurement the probe arm 27 is moved in moving direction B and in so doing, the position in moving direction as well as the pivot position about the pivot axis S is measured. The pivot position is characteristic for a point on the workpiece surface of the workpiece 24 probed by the probe element 29, 30. Because the probe element 29, 30 does not move linearly orthogonally to the moving direction B during the pivot movement, a fault is created that is called cosine fault. This fault can be eliminated by calculation in a control and evaluation unit of the measuring device.

The workpiece 24 to be measured here is a workpiece 24 that comprises a first workpiece surface 24a to be measured at one workpiece side and a second workpiece surface 24b to be measured at the opposite other workpiece side. Both workpiece surfaces 24a, 24b are at least in sections curved to be concave and/or convex and can comprise radii of curvature in the concave and/or convex sections that are constant or varying. The workpiece 24 is particularly an optical workpiece with two optical workpiece surfaces 24a, 24b, e.g. a lens. The optical workpiece surface 24a, 24b can be, e.g. spherically or aspherically or can comprise a freeform or can be a lens array with a plurality of microlenses and optical axes Oi (i=1 . . . n). Different examples for arrangements and extensions for the workpiece surfaces 24a, 24b are schematically illustrated in FIGS. 11-14.

For such workpieces 24 it is important to determine one or more geometric parameters of each workpiece surface 24a, 24b and to additionally determine the relative position or relative orientation of the optical axes O1, O2, assigned to the workpiece surfaces 24a, 24b. The number of optical axes depends on the design of the workpiece and can be two or greater as two.

Before the actual measurement, during which the probe unit 26 is moved along the respective workpiece surface 24a, 24b in moving direction B within the measuring plane (x-z-plane) the apex for the workpiece surface 24a, 24b is determined first that characterizes the puncture point optical axes O1, O2 through the workpiece surface 24a, 24b. This can be executed manually or automatically. For example, two curves can be measured first that are offset to each other in y-direction, that is in direction of the pivot axis S, within a respective x-z-plane and based on the known desired geometry the y-position of the measuring plane (x-z-plane) can be determined by calculation. In x-direction the position of the apex must not be necessarily precisely known, because during the measurement, measurement values are determined in x-direction along the total workpiece surface 24a, 24b anyway.

After determination of the y-position of the apex, that defines the position of the measuring plane, the respective workpiece surface 24a or 24b is measured respectively. The procedure of determination of the y-position of the apex or the measuring plane respectively is executed for the respective workpiece surface 24a or 24b before the measurement. In doing so, it is guaranteed that the measurement at the two workpiece surfaces extends through the apex.

Figure 10:
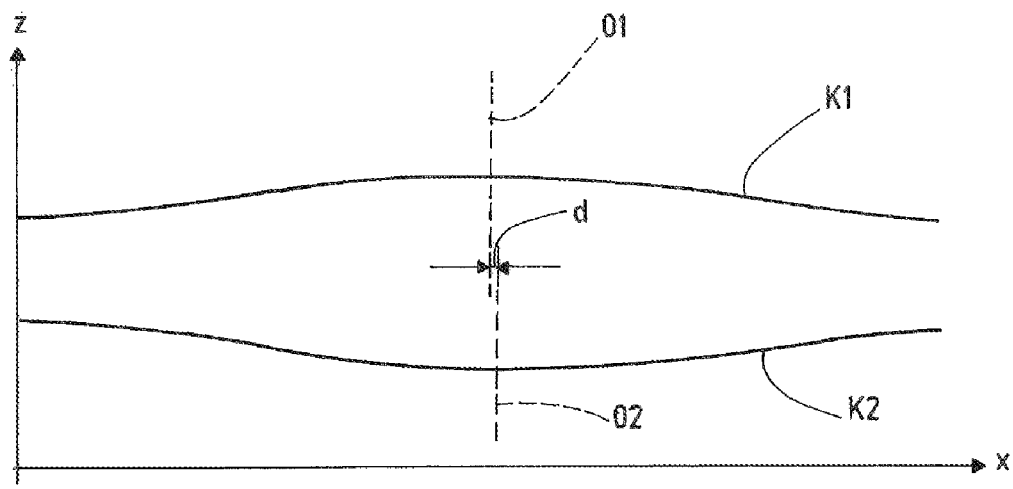
Figure 11:
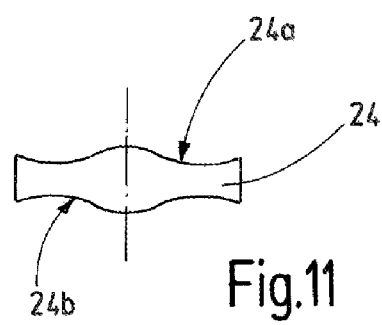
Figure 12:
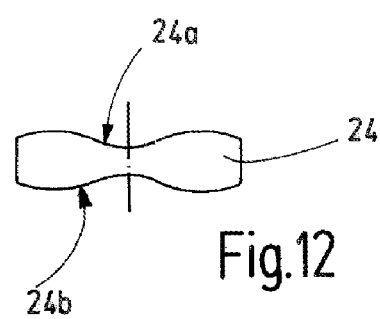
Figure 13:
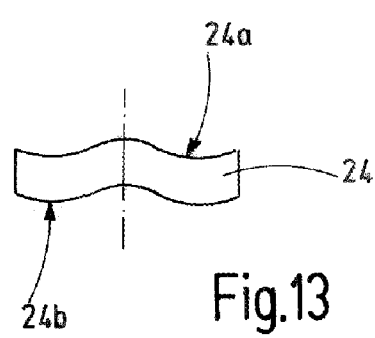
Figure 14:
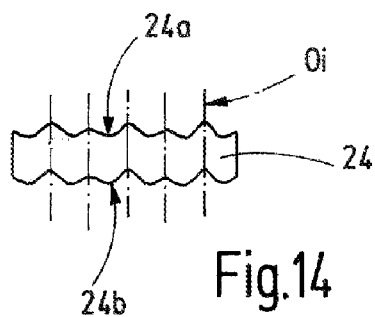

In FIG. 10 a first curve K1 is illustrated, for example, that describes the extension of the first workpiece surface 24a in an x-z-plane including the apex (maximum) of the convex form. A second curve K2 describes the extension including the apex (maximum) of the convex form of the opposite second workpiece surface 24b also in an x-z-plane. Based on the curves K1, K2, a first optical axis 1 of the workpiece 24 at the first workpiece surface 24a and a second optical axis O2 of the workpiece 24 at the second workpiece surface 24b can be determined respectively. The direction of each optical axis O1, O2 can be determined by calculation based on a mathematical relationship, particularly polynomial that characterizes the desired geometry of the respective workpiece surface 24a, 24b. In doing so, an offset d in x- and/or y-direction and/or a tilting between the two optical axes O1, O2 can be determined for example.

For determination of the apex and the measurement of the two workpiece surfaces, the workpiece is not reclamped. The measurement or determination of the optical axes O1, O2 is therefore quickly and easily possible.

The measurement is executed in a way that the probe unit 26 and for example the probe arm 27 is subsequently moved one time along the first workpiece surface 24a and one time along the second workpiece surface 24b, wherein the sequence does not play any role, which of the workpiece surfaces 24a, 24b is measured first. During the measurements the workpiece 24 is not changed regarding its position or orientation. In doing so, a line-shaped measurement along the two workpiece surfaces 24a, 24b is executed respectively. During these measurements a first curve K1 or K2 respectively is measured for each workpiece surface 24a, 24b, as they are exemplarily illustrated in FIG. 10. The measurement of the two workpiece surfaces 24a, 24b can be executed in a plurality of rotational positions of the workpiece 24 about the longitudinal axis L. After a first measurement of the curves K1, K2 in a first rotational position about the longitudinal axis L the clamping device 23 of the measuring device 20 can turn the workpiece 24 about the longitudinal axis L with a desired turning angle, wherein the longitudinal axis L corresponds to a rotational axis of the clamping device 23. In this further rotational position the first and second curves K1, K2 can be measured again.

In order to be able to measure the two workpiece surfaces 24a, 24b of a workpiece 24 in one setting, a workpiece holder 35 is present according to the invention. The workpiece holder 35 is configured to provide accessibility to the two workpiece surfaces 24a, 24b without reclamping of the workpiece 24, such that the two workpiece surfaces 24a, 24b can be reached by the probe unit 26 and for example the probe elements 29, 30 of the probe arm 27.

The workpiece holder 35 is illustrated highly schematically in FIG. 2. The workpiece holder 35 has a support 36 that is configured to clamp the workpiece holder 35 in the clamping device 23. In the embodiment the support 36, therefore, comprises a clamping pin 37 that extends along the longitudinal axis L of the workpiece holder 35, wherein the clamping pin has for example a circular cylindrical shape. At one end of the clamping pin 37 the support 36 comprises a circular-shaped support plate 38, the diameter of which is larger than the diameter of the clamping pin 37. The support plate 38 is arranged coaxially to the longitudinal axis L.

At the support 36 and for example the support plate 38 a holding body 39 is arranged. The holding body 39 has an attachment end 40 that is connected with the support 36 and according to the example with the support plate 38.

In a preferred embodiment the holding body and the support 36 are integrally formed without seam or connection location and can be manufactured from plastic or a metallic material.

From the attachment end 40 the holding body 39 extends away from the support 36 to a free holding end 41. The holding end 41 of the holding body 39 is configured to position and support workpiece 24. For this at least one holding surface and in the embodiment an axial holding surface 42 as well as a peripheral holding surface 43 is present at the holding end 41. The axial holding surface 42 faces away from the support 36 and comprises, for example, a normal vector that is orientated substantially parallel to the longitudinal axis. The peripheral holding surface 43 faces toward the longitudinal axis L and can be orientated orthogonally to the axial holding surface 42. A normal vector of the peripheral holding surface 43 is for example orientated radially to the longitudinal axis L.

In the holding body 39 a free space 47 is present. In the embodiment the free space 47 has a central region 48 with one or more cylindrical or prismatic sections. The central region 48 is preferably symmetrically formed with regard to the longitudinal axis L. The longitudinal axis L extends anyway through the central region 48. The central region 48 is axially open at the side facing away from the support 36 and thus accessible from the holding end 41 in the region of the longitudinal axis L.

The free space 47 further comprises a transverse channel 49 and in the present embodiment a plurality of transverse channels 49, e.g. three transverse channels 49 (FIG. 4) or four transverse channels 49 (FIGS. 5-9). Each transverse channel extends starting from the central region 48 radially with regard to the longitudinal axis L to a peripheral opening 50. At the peripheral opening 50 the respective transverse channel 49 ends at the outside of the holding body 39 and is thus accessible through the peripheral opening 50 from outside radially to the longitudinal axis L. Through the peripheral opening 50 and through the transverse channel 49 the probe unit, particularly a probe arm 27 with a least one probe element 29, 30 can be arranged in the free space 47 and moved therein. In doing so, measuring of the workpiece surface that faces the support, for example the second workpiece surface 24b, is possible in the same setting in which also the opposite workpiece surface 24a can be measured by the probe unit 26.

With view along the longitudinal axis L the transverse channels 49 are arranged in a star-like manner. They are for example uniformly distributed in circumferential direction U about the longitudinal axis L. The peripheral openings 50 of the transverse channels 49 are arranged with distance and for example with uniform distance from each other in circumferential direction U about the longitudinal axis L.

The number of transverse channels 49 can vary. It is preferred, if at least two transverse channels 49 are arranged along a common radial axis orthogonal to the longitudinal axis L, so to say aligned. In doing so, a probe unit 26 can be moved along the aligned transverse channels 49 at or along the total diameter of the second workpiece surface 24b. In the embodiment according to FIGS. 5-9, two of the transverse channels 49 are respectively aligned with each other that oppose each other diametrically with regard to the longitudinal axis L.

In the illustrated embodiment each transverse channel 49 has a main section 51 and a slit section 52 adjoining thereto. The main section 51 and the slit section 52 adjoin each other in axial direction parallel to the longitudinal axis L. The slit section 52 is present at the holding end 41 of the holding body 39, whereas the main section 51 is arranged between the slit section 52 and the support 36 or between the holding end 41 and the support 36 respectively. The main section 51 can be arranged with distance to the support 36 or adjoin the support 36 directly. In the embodiment according to FIGS. 5-9, the main section 51 of each transverse channel 49 ends with distance to the support 36 with view parallel to the longitudinal axis L, such that a ring-shaped closed ring part 53 of the holding body is present that is free from peripheral openings 50 and comprises a closed peripheral surface.

The transverse channels 49 are open at the axial side of the workpiece holder 35 that faces away from the support 36 or the ring part 53 and pass completely through the holding body 39 at the side facing away from the support 36. In doing so, separate holding body parts 54 are created that are separated by the transverse channels 49. In the described preferred embodiment that is illustrated in FIGS. 5-9 the main section 51 of each transverse channel 49 has in circumferential direction U, a larger width than the slit section 52. With radial view to the longitudinal axis L each holding body part 54 thus obtains a T-shaped form with a longitudinal bar 54a extending parallel to the longitudinal axis and a transverse bar 54b extending in circumferential direction U and provided at the holding end 41 of the holding body 39. At each transverse bar 54b an axial holding surface section 42a of the axial holding surface 42 and a peripheral holding surface section 43a of the peripheral holding surface 43 is present. All of the axial holding surface sections 42a are aligned in a common plane orthogonal to the longitudinal axis L. All of the peripheral holding surface sections 43a are arranged in a common cylinder skin surface coaxially to the longitudinal axis L, if the holding body parts 54 are free of forces and not deflected from their respective rest positions.

By the axial holding surface sections 42a, 43a, the workpiece 24 is supported at its peripheral region at a plurality and for example three or four peripheral locations in circumferential direction U. In doing so, the axial holding surface sections 42a contact the peripheral region of the lower workpiece surface 24b and the peripheral holding surface sections 43a contact a peripheral edge or peripheral surface of the workpiece 24. Preferably the workpiece 24 lies only by its own weight on the holding body 39 or on the axial holding surface sections 42a. Alternatively, by elastic deflection of the holding body parts 54 away from the longitudinal axis L, a clamping force can be applied by the peripheral holding surface sections 43a onto the workpiece 24. The clamping force can be low, because during a contactless measurement no measuring forces act upon the workpiece 24 and during a tactile measurement the measuring forces are extremely small, particularly smaller than 5 mN.

In the preferred embodiment the workpiece 24 is not overlapped at the first workpiece surface 24a, such that the first workpiece surface 24a is completely free and not overlapped by parts of the workpiece holder 35.

The shown embodiments of the workpiece holder 35 are configured for holding of round or circular workpieces. In a non-illustrated embodiment the holding body 39 of the workpiece holder 35 can have a prismatic form in sections and can be configured for holding workpieces 24 with a polygonal cross-section.

The invention refers to a workpiece holder 35 as well as a measuring device 20 and a method for executing a measurement by using the workpiece holder 35. The workpiece holder 35 is configured to hold a workpiece 24 with two opposite arranged workpiece surfaces 24a, 24b to be measured in a way that both are accessible by a moveable probe unit 26 and can thus be measured in one setting of the workpiece 24. For this the workpiece holder 35 comprises a support 36 and a holding body 39. The holding body 39 has a holding end 41 away from the support 36 with at least one holding surface 42, 43 at which the workpiece 24 is held. In the holding body 39 a free space 47 is formed that adjoins the workpiece surface 24b facing the support when a workpiece 24 is held and makes the workpiece surface 24b accessible for measuring or probing. The accessibility for the probe unit 26 is provided by a transverse channel 49 extending obliquely or orthogonally to the longitudinal axis L of the workpiece holder 35.

LIST OF REFERENCE SIGNS 20 measuring device
21 machine basis
23 clamping device
24 workpiece
24a first workpiece surface
24b second workpiece surface
25 machine axes arrangement
26 probe unit
27 probe arm
28 free probe end
29 first probe element
30 second probe element
35 workpiece holder
36 support
37 clamping pin
38 support plate
39 holding body
40 attachment end
41 holding end
42 axial holding surface
42a axial holding surface section
43 peripheral holding surface
43a peripheral holding surface section
47 free space
48 central region
49 transverse channel
50 peripheral opening
51 main section
52 slit section
53 ring part of the holding body
54 holding body part
54a longitudinal bar of the holding body part
54b transverse bar of the holding body part
B moving direction
d offset
K1 first curve
K2 second curve
L longitudinal axis
O1 first optical axis
O2 second optical axis
Oi optical axes of a lens array
rS rotational degree of freedom about the pivot axis
S pivot axis
Tx translational degree of freedom in x-direction
Ty translational degree of freedom in y-direction
Tz translational degree of freedom in z-direction
U circumferential direction
x x-direction
y y-direction
z z-direction

The invention claimed is:

1. A measuring device, comprising:
a probe unit moveable in a moving direction;
a clamping device; and
a workpiece holder configured to hold a workpiece having two workpiece surfaces to be measured at opposite workpiece sides during a measurement with the probe unit that is moveable along each of the two workpiece surfaces, the workpiece holder comprising:
a support that is configured to be connected with the clamping device, and
a holding body that is attached with an attachment end at the support and that extends from the support to a free holding end that is arranged with a distance from the attachment end in a direction of a longitudinal axis of the workpiece holder,
wherein in the holding body a free space is present through which the longitudinal axis extends and wherein the holding body comprises transverse channels with peripheral openings configured for access by the probe unit, wherein the transverse channels separate the holding body into a plurality of holding body parts that are spaced apart from one another in a circumferential direction,
wherein the peripheral openings communicate with the free space and extend longitudinally below at least one holding surface of the free holding end, wherein the free space is accessible through the peripheral openings from outside radially with regard to the longitudinal axis,
wherein the peripheral openings and the transverse channels are configured such that the probe unit can be arranged and moved in the free space through the peripheral openings and the transverse channels during measurement of the workpiece surface that faces the transverse channel,
wherein the at least one holding surface is configured to support the workpiece at a peripheral region thereof, and wherein each of the plurality of holding body parts include a peripheral holding surface facing the longitudinal axis for applying a clamping force onto the workpiece due to elastic deflection of the plurality of holding body parts away from the longitudinal axis.

2. The measuring device according to claim 1, wherein the peripheral openings of the transverse channels are spaced apart from one another in a circumferential direction about the longitudinal axis of the workpiece holder.

3. The measuring device according to claim 1, wherein each transverse channel comprises a main section and a slit section that is smaller in a circumferential direction compared with the main section and that adjoins the main section in the direction of the longitudinal axis.

4. The measuring device according to claim 3, wherein the slit section is arranged at the free holding end of the holding body.

5. The measuring device according to claim 3, wherein the main section is arranged closer to the support than the slit section.

6. The measuring device according to claim 1, wherein the at least one holding surface of the holding body comprises an axial holding surface at the free holding end that faces away from the support.

7. The measuring device according to claim 6, wherein the axial holding surface is oriented orthogonally with respect to the longitudinal axis.

8. The measuring device according to claim 1, wherein the at least one holding surface comprises a plurality of axial holding surfaces oriented orthogonally with respect to the longitudinal axis.

9. A measuring device according to claim 1, wherein the probe unit comprises one probe arm that is pivotably supported about a pivot axis extending orthogonal to a movement direction in which the probe arm is moved during measurement, and wherein the probe arm has a free probe end spaced from the pivot axis at which at least one probe element is arranged.

10. A measuring device according to claim 9, wherein a first probe element and a second probe element are arranged at the free probe end that extend in opposite directions away from the probe arm.

11. A measuring method for measuring a workpiece that comprises a first workpiece surface and a second workpiece surfaces that are present at opposite sides of the workpiece by using a measuring device according to claim 1, the method comprising:

arranging the workpiece at the free holding end of the workpiece holder, such that a clamping force is applied by the peripheral holding surfaces onto the workpiece due to elastic deflection of the holding body parts away from the longitudinal axis, determining an apex of the first workpiece surface and the second workpiece surface without reclamping the workpiece, wherein the apex of the first workpiece surface is defined by an intersection point of a first optical axis through the first workpiece surface and wherein the apex of the second workpiece surface is defined by the intersection point of a second optical axis through the second workpiece surface, measuring the first workpiece surface facing away from the support of the workpiece holder by moving the probe unit along the first workpiece surface, measuring the second workpiece surface facing the support of the workpiece holder by moving the probe unit along the second workpiece surface in the free space of the workpiece holder.

12. A measuring method according to claim 11, wherein determining the apex for the first and second workpieces is done prior to measuring of the first and second workpiece surfaces, and the method comprises determining only a single coordinate value of each of the apex for the first workpiece surface and the apex of the second workpiece surface, wherein the coordinate values are positioned along a direction transverse to a measurement direction in which the probe unit is moved during the subsequent measuring of the first and second workpiece surfaces.

\* \* \* \* \*